UNITED STATES PATENT OFFICE.

OLIVER HOLDEN, OF CHICAGO, ILLINOIS.

IMPROVEMENT IN ANTI-INCRUSTATION ALLOYS.

Specification forming part of Letters Patent No. 177,513, dated May 16, 1876; application filed October 19, 1875.

*To all whom it may concern:*

Be it known that I, OLIVER HOLDEN, of Chicago, in the county of Cook and State of Illinois, have invented a new and useful compound—Anti-Incrustation Alloy—which compound is fully described in the following specification:

The nature of this invention relates to that class of compounds used to prevent incrustation in steam-boilers; and it consists in compounding zinc, tin, lead, and antimony in certain proportions, as more fully hereinafter described.

When iron is in contact with fresh, salt, or acidulated water, or dampness in the earth, oxidization results, and incrustation is formed, especially if the water is subjected to heat. To protect the iron from such incrustation is the object of my invention; and it consists in effecting the result by the application to, or connection with, the iron, of a compound of metals which are electro-positive and electro-negative in relation to iron, as a positive metal and a negative metal attract and protect each other.

This alloy I attach to the iron at convenient points, somewhat distant from each other, by applying it in the form of rivets or bolts inserted in various portions of the boiler or vessel; or in the shape of rings, bands, or plates, which are hung upon the tubes or flues of the boiler, or otherwise fastened to the structure in any convenient manner.

The alloy consists in a compound of zinc, from thirty-three to fifty parts, by weight; tin, thirty-three to fifty parts, by weight; lead, one to ten parts by weight, and antimony one to ten parts, by weight. These are combined by melting them together, or by melting separately, and mixing the same, forming a homogeneous metal.

To make a compound of these metals which shall be homogeneous, proper fluxes must be used, and great care exercised in melting, preference always being in favor of a close vessel—as a crucible with cover. First, melt the antimony, keeping the molten metal covered with a flux of powdered borax and resin, (each four (4) parts,) and one part potash, thoroughly mixed, to which add the lead. Melt the other two metals in separate vessels—the tin first. Then add the flux, and then the zinc. When melted, stir thoroughly with a stick of white wood. Now, pour the molten antimony and lead into the zinc and tin, stirring the whole thoroughly during the pouring out, keeping the mass covered with the flux to prevent oxidization by exposure to the atmosphere.

I am aware that a combination of tin and zinc has heretofore been employed, and which, under some circumstances, will produce beneficial results; but a combination of such metals may not produce electrical action in certain solutions—as, for example, in certain neutral waters, such as the Cochituate, of Boston, or certain mineral waters, such as exist in some of the northwestern States. Therefore injurious deposits form; but, with the addition of lead and antimony, such deposits will be prevented, although the water may contain a large percentage of impurities. Besides this, the metals, properly compounded, will prevent the adhesion to iron of vegetable or animal matter.

Combining metals positive and negative to iron in such proportions as to the liquids to be resisted, so that there shall be the least amount of energy exerted to perform the work, forms the principle of this invention. Different waters require different proportions of the metals.

The rendering of iron electro-negative (and hence preventing its affinity for oxygen) can only be done at some cost or force, but the cost or force required can be regulated by my mixture of metals so perfectly as to make the cost or force almost nothing. To illustrate: When iron is subjected to the action of saline water I would use, zinc, forty parts, by weight; tin, fifty parts; lead, ten parts; antimony, five parts; but, if the same water was above a boiling-heat, I would use—zinc, thirty-three parts; tin, fifty parts; lead and antimony, each, one part. In fresh neutral waters I would use— zinc, fifty parts; tin, thirty-three parts; lead, ten parts, and antimony five parts. In acidulated water I would use—zinc, thirty-three parts; tin, fifty parts; lead and antimony, each, one part; or in proper proportions to resist the action of the liquid in which they may be placed.

I am also aware that an alloy has before been made consisting of zinc, tin, lead, and antimony, but the particular proportions of the constituents of my alloy adapt it for the purpose above described.

What I claim as my invention is—

An alloy for preventing incrustation in steam-boilers, consisting of—zinc and tin, from thirty-three to fifty parts, by weight, lead and antimony, one to ten parts, by weight, substantially as described.

OLIVER HOLDEN.

Witnesses:
L. F. HYDE,
JESSE HOLDEN.